: 3,357,995
THIOETHER PRODUCTION
Harvey S. Klein, Berkeley, Calif., assignor to Shell Oil Company, New York, N.Y., a corporation of Delaware
No Drawing. Filed Nov. 26, 1965, Ser. No. 510,071
7 Claims. (Cl. 260—327)

This invention relates to an improved method for the production of certain aliphatic thioethers.

Reactions of olefinic hydrocarbons with sulfur dioxide are known in the art. In one type of reaction, an olefin such as ethylene reacts with sulfur dioxide at relatively low temperatures in the presence of a reaction diluent to produce polymeric polysulfones. In an alternate type of reaction, sulfur dioxide reacts with olefinic hydrocarbons at elevated temperature in the presence of metal oxide catalysts to produce dehydrogenated products such as thiophene. Little is known of the reactions of olefinic hydrocarbons with sulfur dioxide and hydrogen.

It is an object of the present invention to provide an improved process for the production of certain aliphatic thioethers. More particularly it is an object to provide an improved process for the production of 1,2-bis(alkylthio)alkanes and alkyl-substituted 1,3-dithiolanes.

It has now been found that these objects are accomplished by the process of contacting an olefinic hydrocarbon with sulfur dioxide and hydrogen in the presence of a palladium halide catalyst.

Suitable olefinic reactants are acyclic organic hydrocarbon olefins of from 2 to 8 carbon atoms and of one ethylenic linkage, i.e., one nonaromatic carbon-carbon double bond, having at least one hydrogen substituent on at least one carbon atom which is a portion of the ethylenic linkage. The process of the invention is broadly applicable to such alkenes having terminal or internal ethylenic linkages as well as alkenes of straight-chain or of branched-chain structure, and illustrative olefinic reactants include ethylene, propylene, 1-butene, 2-butene, isobutylene, 1-pentene, 3-methyl-1-pentene, 1-hexene, 2-hexene, 1-octene and 3-octene. In general, however, straight-chain alkenes are to be preferred over corresponding olefinic reactants of a branched-chain structure, and particularly preferred are straight-chain olefins having a terminal ethylenic linkage, i.e., straight-chain 1-alkenes. Ethylene and propylene comprise an especially preferred class of olefinic reactants.

The olefinic reactant is contacted with hydrogen and sulfur dioxide. No special precautions are required with regard to these inorganic reactants and commercially available grades of these materials are satisfactory. Although the precise molar ratio of reactants is not critical, best results are obtained when each of the olefin and hydrogen reactants are employed in molar amounts equal to or in excess over the molar amount of sulfur dioxide reactant. Thus, molar ratios of sulfur dioxide to alkene from about 1:1 to about 1:30 are satisfactory with molar ratios of from about 1:5 to about 1:20 being preferred. In like manner, molar ratios of hydrogen to sulfur dioxide from about 1:1 to about 30:1, preferably from about 5:1 to about 20:1, are satisfactory.

The catalyst employed in the process of the invention is a palladium halide, that is, a compound of the formula $PdX_2$ wherein X is halogen. Although palladium halides wherein the halogen is fluorine or iodine are in part operable, better results are obtained when the catalyst is a palladium halide of halogen of atomic number from 17 to 35 inclusive, that is, the middle halogens chlorine and bromine. Particularly preferred as catalyst is palladium chloride.

The palladium halide is employed in catalytic quantities. Molar ratios of palladium halide to the sulfur dioxide of from about 1:5 to about 1:50 are satisfactory with molar ratios of from about 1:7 to about 1:20 being preferred.

The contacting of the alkene, sulfur dioxide and hydrogen reactants is conducted in the liquid phase in solution in an inert reaction solvent. Solvents that are suitably employed are those which are liquid at reaction temperature and pressure and are inert to the reactants as well as the products produced therefrom. Illustrative solvents include hydrocarbons free from aliphatic unsaturation such as benzene, toluene, xylene, heptane, isooctane and cyclohexane; halogenated hydrocarbons such as chloroform, carbon tetrachloride and methylene bromide; and ethers including dialkyl ethers such as dipropyl ether, dibutyl ether and methyl hexyl ether, lower alkyl ethers (full) of polyhydric alcohols and poly(oxyalkylene)glycols such as diethoxyethane, glycerol tripropyl ether and diethylene glycol dimethyl ether, and cyclic ethers such as dioxane and tetrahydrofuran. In general, the preferred solvents comprise the hydrocarbons, particularly aromatic hydrocarbons. The amount of solvent is not critical and molar ratios of solvent to total reactants from about 1:2 to about 20:1 are satisfactory.

The method of reactant contacting may be varied. In one modification, the entire amounts of reactants, catalyst and solvent are charged to an autoclave or similar reactor wherein the mixture is maintained at reaction conditions until reaction is complete. In an alternate modification, one reactant is added to the remaining reaction mixture components in increments, preferably as by adding the olefinic reactant to the other reaction mixture components. In yet another modification, reaction is effected in a continuous operation as by contacting the reactants and the catalyst during passage through a tubular reactor. In any modification, the reaction is conducted at elevated temperature and pressure. Suitable reaction temperatures vary from about 70° C. to about 250° C. with the temperature range from about 100° C. to about 200° C. being preferred. Typical reaction pressures vary from about 100 p.s.i. to about 6000 p.s.i. Good results are frequently obtained when autogenous pressure is employed, that is, the pressure generated when the reaction mixture is heated to reaction temperature in a sealed reactor. Subsequent to reaction the reaction mixture is separated and the desired thioether products are recovered by conventional means, e.g., fractional distillation, selective extraction, fractional crystallization and the like.

The thioether products of the invention comprise 1,2-bis(alkylthio)-alkanes and alkyl-substituted dithiolanes. The olefinic reactant, as above defined, may be represented by the following formula.

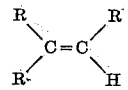

wherein R independently is hydrogen or alkyl. In terms of this formula the 1,2-bis(alkylthio)alkane products are represented by the formula

wherein R has the previously stated significance, and the alkyl-substituted dithiolane products are represented by the formula

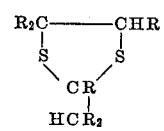

wherein R has the previously stated significance. Illustrative products include 1,2-bis(ethylthio)ethane and 2-methyl-1,3-dithiolane produced by reaction of ethylene with sulfur dioxide and hydrogen, and 1,2-bis(2-propylthio)-propane, 2-ethyl-4-methyl-1,3-dithiolane, 2,2,4-trimethyl- 1,3-dithiolane and 1-(propylthio)-2-(2-propylthio)propane produced by reaction of propylene with hydrogen and sulfur dioxide.

The thioether products are stable, high-boiling liquids, relatively free of objectionable odor, which are useful as reaction solvents in applications requiring utilization of solvents at high temperatures. The products are also useful as chemical intermediates, being oxidized in known manner to disulfones which are useful as selective extraction solvents, for example in the extraction of aromatic hydrocarbons from mixtures thereof with aliphatic hydrocarbons of similar boiling point.

To further illustrate the improved process of the invention, the following examples are provided. It should be understood that the details thereof are not to be regarded as limitations as they may be varied as will be understood by one skilled in this art.

Example I

To an autoclave was charged 16 g. of ethylene, 6 g. of sulfur dioxide, 2 g. of hydrogen, 1 g. of palladium chloride and 20 ml. of benzene. The reaction mixture was maintained at 150° C. and a pressure of 1500–2000 p.s.i.g. for 25 hours during which time the autoclave was rocked. The product mixture was then removed and analyzed by gas-liquid chromatographic methods. The conversion to products, based on the sulfur dioxide, was 30%. Employing preparative gas-liquid chromatographic techniques, two products were isolated.

One product, obtained in a 12% yield, was 2-methyl-1,3-dithiolane which had a refractive index, $n_D^{25}$, of 1.5531 and the following elemental analysis.

*Analysis.*—Calc.: C, percent wt., 40.0; H, percent wt., 6.6; S, percent wt., 53.4. Found: C, percent wt., 40.2; H, percent wt., 6.6; S, percent wt., 53.3.

The structure of this product was confirmed by mass spectrometric analysis and the nuclear magnetic resonance spectrum which was consistent with the above formula.

The second product, obtained in 87% yield, was 1,2-bis(ethylthio)ethane, B.P. 211° C., $n_D^{20}$ 1.5126, which had the followed elemental analysis.

*Analysis.*—Calc.: C, percent wt., 48.0; H, percent wt., 9.3; S, percent wt., 42.8. Found: C, percent wt., 47.8; H, percent wt., 9.3; S, percent wt., 42.7.

The structure of this product was confirmed by mass spectrometric analysis and the nuclear magnetic resonance spectrum which was consistent with the above formula.

Similar results are obtained when palladium bromide is employed as the catalyst.

Example II

To an autoclave was charged 6 g. of sulfur dioxide, 24 g. of propylene, 1 g. of hydrogen, 1 g. of palladium chloride and 20 ml. of benzene. The reaction mixture was maintained at 150° C. and a pressure of 1200–2000 p.s.i. for 50 hours and then analyzed and separated by the procedure of Example I. A total of 2 grams of product was obtained consisting of four major fractions.

One product fraction, obtained in 5% yield was 2,2,4-trimethyl-1,3-dithiolane, B.P. 187° C., $n_D^{25}$ 1.5023, having the following elemental analysis.

*Analysis.*—Calc.: C, percent wt., 48.6; H, percent wt., 8.1; S, percent wt., 43.2. Found: C, percent wt., 47.8; H, percent wt., 8.4; S, percent wt., 43.3.

The mass spectrometric analysis and the nuclear magnetic resonance spectrum of this product were consistent with the above structure.

The second major product, obtained in 20% yield, was 2-ethyl-4-methyl-1,3-dithiolane, B.P. 193° C., $n_D^{25}$ 1.5251, having the following elemental analysis.

*Analysis.*—Calc.: C, percent wt., 48.6; H, percent wt., 8.1; S, percent wt., 43.2. Found: C, percent wt., 48.7; H, percent wt., 7.8; S, percent wt., 43.1.

The mass spectrometric analysis and the nuclear magnetic resonance spectrum of this product were consistent with the above structure.

A third major product, obtained in 55% yield, was 1,2-bis(2-propylthio)propane, $n_D^{25}$ 1.4906, B.P. 226° C., having the following elemental analysis.

*Analysis.*—Calc.: C, percent wt., 56.2; H, percent wt., 10.4; S, percent wt., 33.4. Found: C, percent wt., 55.3; H, percent wt., 11.0; S, percent wt., 33.5.

The structure of this product was confirmed by mass spectrometric analysis and by the nuclear magnetic resonance spectrum which were consistent with the above formula.

Also obtained in 10% yield was a fourth product, B.P. (dec.) 118° C., $n_D^{25}$ 1.4960, which is believed to be 1-propylthio-2-(2-propylthio)propane. The product had the following elemental analysis.

*Analysis.*—Calc.: C, percent wt., 56.2; H, percent wt., 10.4; S, percent wt., 33.4. Found: C, percent wt., 55.4; H, percent wt., 10.5; S, percent wt., 32.8.

I claim as my invention:
1. The process of producing a thioether product by intimately contacting
   (a) an acyclic organic hydrocarbon olefin of from 2 to 8 carbon atoms and of one ethylenic linkage having at least one hydrogen substituent on at least one carbon atom which is a portion of the ethylenic linkage;
   (b) sulfur dioxide, the molar ratio of sulfur dioxide to the olefin being from about 1:1 to about 1:30; and
   (c) molecular hydrogen, the molar ratio of hydrogen to sulfur dioxide being from about 1:1 to about 30:1;

in the presence of a catalytic amount of a palladium halide catalyst, in liquid-phase solution in inert reaction solvent at a temperature of from about 70° C. to about 250° C. and a pressure of from about 100 p.s.i. to about 6000 p.s.i.

2. The process of claim 1 wherein the olefin is a straight-chain 1-alkene.
3. The process of claim 1 wherein the catalyst is a palladium halide wherein the halogen is halogen of atomic number from 17 to 35 inclusive.
4. The process of claim 3 wherein the palladium halide is palladium chloride.
5. The process of claim 4 wherein the olefin is selected from ethylene and propylene.
6. The process of claim 5 wherein the alkene is ethylene.
7. The process of claim 5 wherein the alkene is propylene.

References Cited

Kharasch: Organic Sulfur Compounds, Pergamon Press, New York (1961), pages 260–1.

JAMES A. PATTEN, *Primary Examiner.*